United States Patent
Ball

[11] Patent Number: 6,102,341
[45] Date of Patent: Aug. 15, 2000

[54] SPEED CLIP HANGER BRACKET

[76] Inventor: Richard Ball, 529 N. Cherry NBU 20, Fruita, Colo. 81521

[21] Appl. No.: 09/223,933

[22] Filed: Dec. 31, 1998

[51] Int. Cl.[7] .................................................. E21F 17/02
[52] U.S. Cl. .................................. 248/58; 248/59; 248/62
[58] Field of Search ................................ 248/58, 59, 62, 248/70, 72, 74.4

[56] References Cited

U.S. PATENT DOCUMENTS

| | | | |
|---|---|---|---|
| 317,613 | 5/1885 | Blake | 248/59 |
| D. 377,750 | 2/1997 | Hubbard | D12/180 |
| 950,978 | 3/1910 | Williams | 248/72 |
| 1,362,244 | 12/1920 | Farley | 248/59 |
| 1,362,245 | 12/1920 | Farley | 248/58 |
| 2,161,782 | 6/1939 | Flower | 248/59 |
| 4,004,767 | 1/1977 | Chilton | 248/58 |
| 4,004,768 | 1/1977 | Evans et al. | 248/59 |
| 4,019,705 | 4/1977 | Habuda, Sr. et al. | 248/58 |
| 4,047,683 | 9/1977 | Takeuchi | 248/62 |
| 4,113,286 | 9/1978 | Kennedy, Jr. | 248/61 |
| 4,407,479 | 10/1983 | Combe | 248/59 |
| 4,767,087 | 8/1988 | Combu | 248/62 |
| 5,219,427 | 6/1993 | Harris | 248/59 |
| 5,624,217 | 4/1997 | Hungerford, Jr. | 411/85 |

FOREIGN PATENT DOCUMENTS

| | | |
|---|---|---|
| 118584 | 3/1983 | European Pat. Off. . |
| 9518057 | 6/1996 | WIPO . |

*Primary Examiner*—Ramon O. Ramirez
*Assistant Examiner*—Anita M. King
*Attorney, Agent, or Firm*—Allen H. Erickson

[57] ABSTRACT

A speed clip hanger bracket for suspending spiral pipes from a structural member comprises a planar rectangular bracket plate having an aperture therethrough perpendicular to the plane of the plate, and an elongate nut extender welded to one edge of the plate. A threaded through-hole in the nut extender may be screwed onto a threaded rod hanging from a hanger clamp, and a fastener passed through the plate aperture and holes in each flange of a pipe band to join them together and support a pipe.

12 Claims, 3 Drawing Sheets

SPEED CLIP HANGER BRACKET

BACKGROUND OF THE INVENTION

1. Field of the Invention

This invention relates generally to hangers for suspending pipes, tubes, ducts and other apparatus from floor joists, beams and the like. More particularly, the invention pertains to a universal bracket for use with commercial beam clamps and the like, by which spiral pipe may be suspended in commercial and home applications.

2. State of the Art

Various pipe hanger designs have been used for many years. Sometimes, a pipe-fitter will custom make hangers appropriate for the particular pipe size, pipe weight, working space and suspending distance. For example, a hanger band of thin metal encircling a pipe is bent at each end to form matching vertical flanges and a horizontal portion. Holes are formed in the flanges for bolting them together, an in the horizontal portion so that a nut may be screwed onto a vertical threaded rod passed through the horizontal portion. The resulting hanger requires a substantial number of bending steps. Attachment of the nut to the vertical support rod may be difficult because of the limited space for inserting fingers or a tool to turn the nut. Furthermore, the nut must be turned while the weight of the pipe is applied to it, leading to the stripping of threads. The final step of attaching the nut determines the installed pipe elevation; thus, pre-setting of the pipe elevation to blueprint specifications cannot be done. In addition, such pipe hangers tend to bend under pipe weight to a lowered position.

One recurring difficulty in hanging pipes is that the space for working on the pipe may be extremely cramped, and it may be necessary to support the pipe in the desired position while attempting to hold a bolt and a small nut in one's fingers, hold several parts of the hanger so that holes in each are aligned, inserting the bolt and threading the nut onto the bolt. It may be necessary to accomplish these actions with one's arms fully extended. It is easy to drop one or more of the parts while attempting to manipulate them in unison.

Various attempts have been made to provide apparatus and methods for suspending pipes more quickly, more easily, more precisely and at lower cost.

U.S. Pat. Nos. 1,362,244 and 1,362,245 of Farley depict an early pipe hanger comprising a perforated flexible strap bolted to a perforated stirrup strip which is passed around a pipe. Adjustment of suspension height is limited to the particular hole spacing.

U.S. Pat. No. 4,004,768 of Evans et al. discloses a tailpipe hanger for automobiles. A flexible strap supports a pair of parallel multi-member flexible shock- and sound-absorbing strap members. The hanger has a purpose which differs from that in building construction, is inapplicable to large heavy piping, and complex in manufacture.

U.S. Pat. No. 4,004,767 of Chilton shows a pipe hanger with an upper hanger screwed to a beam and a lower pipe supporting saddle which may be quickly attached to the hanger by rotation.

A pipe hanger for attaching a pipe in close proximity to a wall is shown in PCT Publication No. WO 96/18057. This hanger is not adaptable for suspending a pipe significantly below a beam or ceiling, and once installed, is not adjustable.

In U.S. Pat. No. 4,113,286 of Kennedy, Jr., a pipe hanger is shown with three legs which clamp together to compress a pipe encircling gasket.

European Patent Publication No. 0 118 584 of Hurtubise shows a hanger for hanging multiple pipes. It is not applicable to large diameter pipes, and unless balanced, will tend to bend and loosen the support rod from its upper attachment.

U.S. Pat. No. 5,219,427 of Harris, U.S. Pat. No. 3,623,686 of Dupuis, and U.S. Pat. No. Design 330,672 of Wilkinson, III show a clevis type pipe hanger which is attached to a vertical threaded rod by a simple nut, and with a horizontal bolt holding a lower yoke to an upper yoke.

In U.S. Pat. No. 4,047,683 of Takeuchi, a pipe hanger includes a closed loop element formed of a strip of sheet metal and having slots into which formed ends of a hanger band may be temporarily inserted and held pending full tightening of a screw fastener. A specially made nut is rotatably mounted atop the closed loop element with a thin flange, the latter representing a weak link in the entire hanger. Manufacture of the closed loop element requires cutting of the sheet metal strip, punching of five holes in the strip, bending the strip (six bends), molding and threading the nut, inserting the nut end in a topmost (horizontal) hole, placing a washer over the nut end, and crimping the rim of the nut end about 360 degrees within the small space in the closed loop. The manufacture requires many steps and is time consuming and expensive.

In U.S. Pat. No. 4,019,705 of Habuda, Sr. et al., a pipe hanging apparatus includes a specially made rotatable nut with a flanged end, or alternatively, a standard threaded nut rotatable relative to the collar. Manipulation of the nut e.g. with a wrench while attaching it to a support rod is difficult because of the limited space.

U.S. Pat. No. 5.624,217 of Hungerford, Jr. discloses a channel connector with two opposed, spaced apart lugs for suspending a pipe from a structural channel.

U.S. Pat. No. Design 377,750 of Hubbard shows a simple elongate hanger comprising a formed handle with a hole for passing a pipe therethrough. Such a hanger is not applicable to a large diameter pipe and must be preinstalled on a pipe prior to hanging.

In U.S. Pat. No. 950,978 of Williams, a pipe hanger is shown in which a supporting small diameter pipe has a pipe cap on its lower end with a downwardly projecting lug with a hole through it. A bolt is passed through ends of the pipe cradle band and the lug.

The above indicated prior art references show pipe hanging devices which are complex and difficult to manufacture in high volume, or are not applicable to typical spiral pipe sizes used in industrial and home construction. A pipe hanger bracket is needed which works with any beam clamp or other clamp having a continuously threaded support rod, and also cooperates with a support band with simple bent ends having a hole. In addition, a pipe hanger bracket is needed to reduce the number of fasteners (nuts and bolts), such being easily lost in a construction area. In addition, a pipe hanger bracket is needed which is easier and less expensive to construct, is stronger than prior art brackets, is easier to install with accuracy, and may be preset to a desired pipe elevation.

BRIEF SUMMARY OF THE INVENTION

The invention comprises a speed clip hanger bracket for suspending pipes, tubes, ducts and the like from a vertical threaded rod. The speed clip hanger bracket is an intermediary member of a pipe suspension apparatus, and is adjustably attachable to a suspended threaded rod and has means for attaching a pipe band thereto.

Although other types of pipe may be hung with this invention, it was developed primarily for use with spiral pipe constructed of thinwall material and having outside diameters of about 6 to about 36 inches. Such pipe is used for carrying various fluids, including gases such as air or natural gas and liquids including water.

BRIEF DESCRIPTION OF THE DRAWINGS

The invention is illustrated in the following figures, wherein:

FIG. 4 is a front view of a speed clip hanger bracket of the invention; an

DESCRIPTION OF THE ILLUSTRATED EMBODIMENTS

Figure 1:
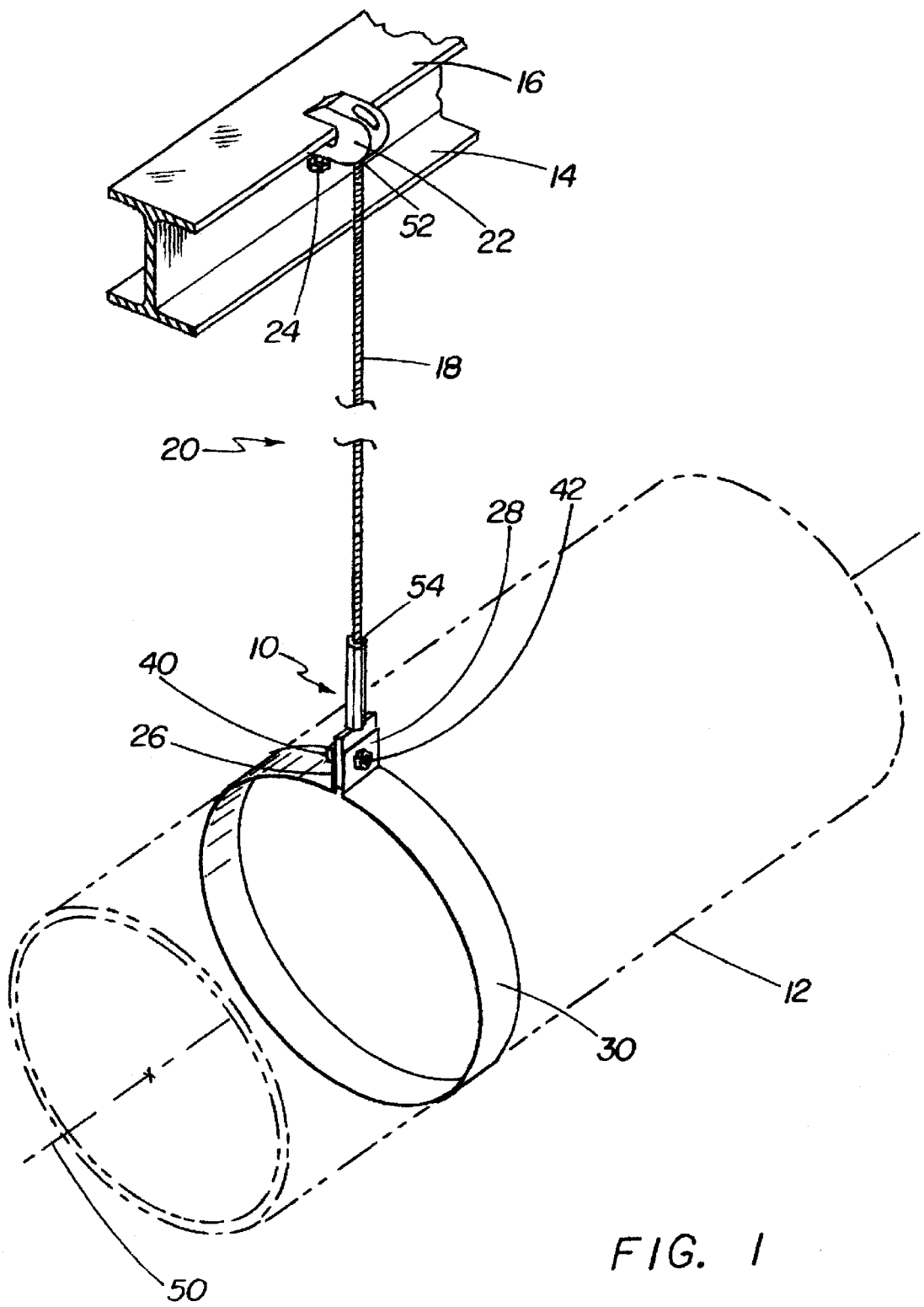
FIG. 1 is a perspective view of a pipe hanger apparatus including a speed clip hanger bracket of the invention, shown as installed for suspending a pipe from an I-beam.

As shown in FIGS. 1 through 5, a speed clip hanger bracket 10 of the invention comprises a portion of a pipe hanger apparatus 20 for suspending spiral pipe 12 from a structural member 14 such as a beam, post, ceiling, or the like. In FIG. 1, an exemplary structural member 14 is depicted as an I-beam. A fixture 22, shown here as a conventional hanger clamp is attached to the upper flange 16 by setscrew 24. Other fixtures 22 attachable to wooden joists, floor boards, etc. may be used depending upon the particular structure from which the pipe 12 is to be suspended.

A length of rod 18, having its opposing ends 52, 54 threaded, has one end 52 screwed into the fixture 22, and the opposing end 54 is shown screwed into a speed clip hanger bracket 10 of the invention. Preferably, the rod 18 has a continuous screw thread 46 extending from end 52 to the opposing end 54. Such rod 18, known in the art as "all-thread", is available in long lengths which may be cut to a desired length for hanging a pipe 12 at a specified elevation.

In most cases, standard all-thread rod 18 of ⅜ inch diameter may be used. However, rod sizes of greater or lesser diameter may be used. For most commercial and home construction projects, a single rod size is required. Thus, the number of sizes to be purchased, stocked and installed results in added efficiency.

The rod 18 is typically formed of steel but corrosion resistant metal may also be used, particularly in damp locations.

As further shown in the drawings, a hanger band 30 generally formed of thin sheet metal is configured to pass around the exterior of a pipe 12 to be suspended. Pipe 12 is shown with center axis 50. Each end 56, 58 of the hanger band 30 is bent into an outwardly extending flange 26; 28 along bend lines 60, 62, respectively. An orifice is punched in a generally central portion of each flange 26, 28 to accommodate the passage of a fastener 40 such as a bolt therethrough; these orifices are designated by the numerals 32A, 32B.

The speed clip hanger bracket 10 of this invention is a simple apparatus which is formed of readily available materials. As shown in FIGS. 2–5, the hanger bracket 10 comprises a bracket plate 34 and a nut extender 36.

The bracket plate 34 is a generally rectangular piece of thin metal plate material, such as steel or stainless steel plate with a thickness 64 of greater than 1/32 inch, typically about ⅛ inch, height 70, and width 68.

An aperture 44 is punched, drilled or otherwise formed in the bracket plate 34 within the central plate portion 66, the latter comprising about ⅓ of the plate width 68. The aperture 44 has a central axis 48, and a fastener 40 such as a bolt may be passed through the aperture 44 and a nut 42 screwed onto it to attach the flanges 26,28 of the hanger band 30 to the bracket plate 34.

The bracket plate 34 is sized so that the width 68 is approximately equal to the width 82 of the flange 26 of the hanger band 30. This enables the installer to hold a flange or flanges 26 and the bracket plate 34 as a single unit, with openings 32A, 32B and aperture 44 aligned for insertion of the fastener 40, e.g. bolt and attachment of the nut 42. This results in much improved ease of installation. In addition, the bracket plate 34 reduces twisting of the flanges 26 when a heavy load is applied to the hanger, being a supportive member therebetween.

A nut extender 36 such as is commonly available is welded to an upper end 78 of the bracket plate 34 with weldment 38. The nut extender 36 has an elongate threaded through-hole 74 coaxial with central axis 72 for attachment to a threaded support rod 18. Through-hole 74 preferably has at least 20 turns of standard thread and a depth of about 1 to about 4 inches. Typically, the exterior of the nut extender 36 has a polygonal shape for rotation by a wrench (not shown).

Figure 2:
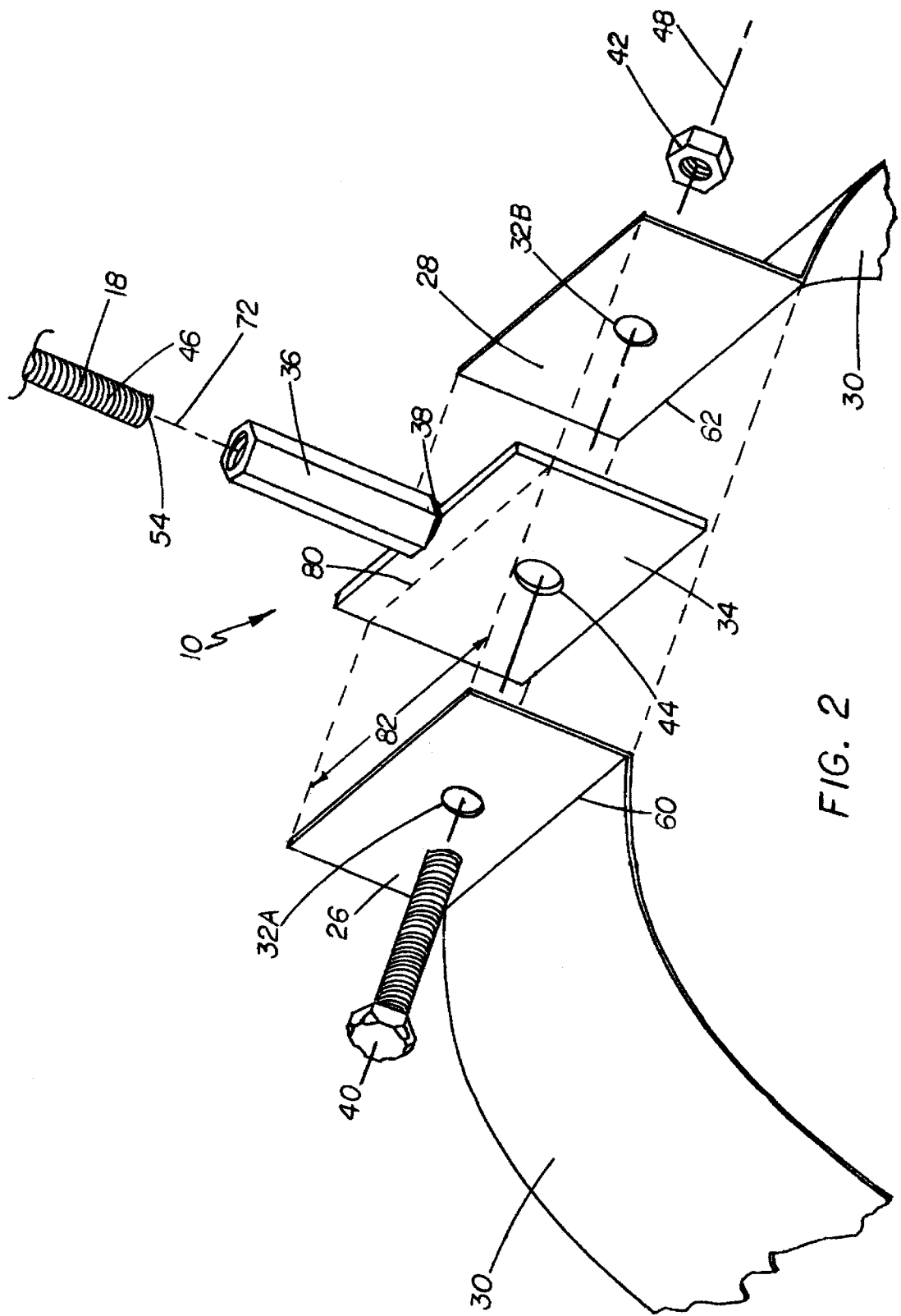
FIG. 2 is an enlarged perspective view of a speed clip hanger bracket of the invention showing its connections to a threaded rod and a pipe band.
Figure 3:
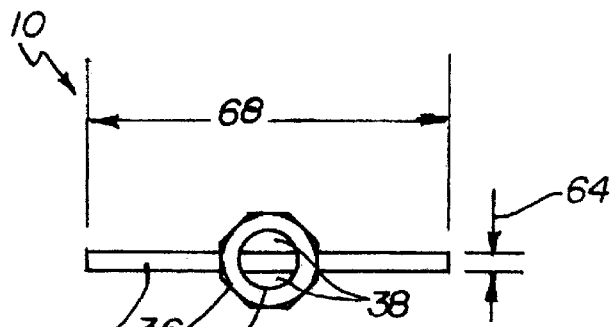
FIG. 3 is a op view of a speed clip hanger bracket of the invention.
Figure 4:
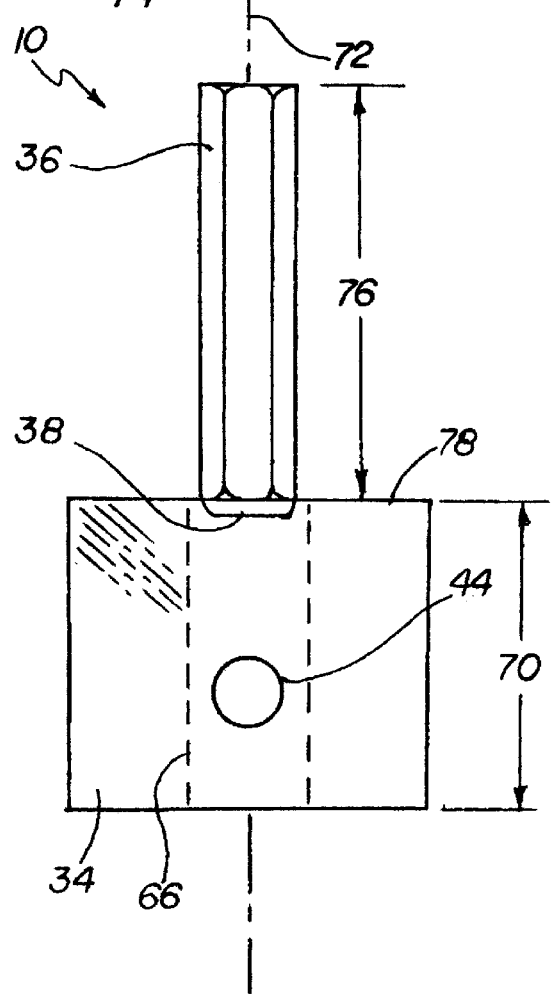
Figure 5:
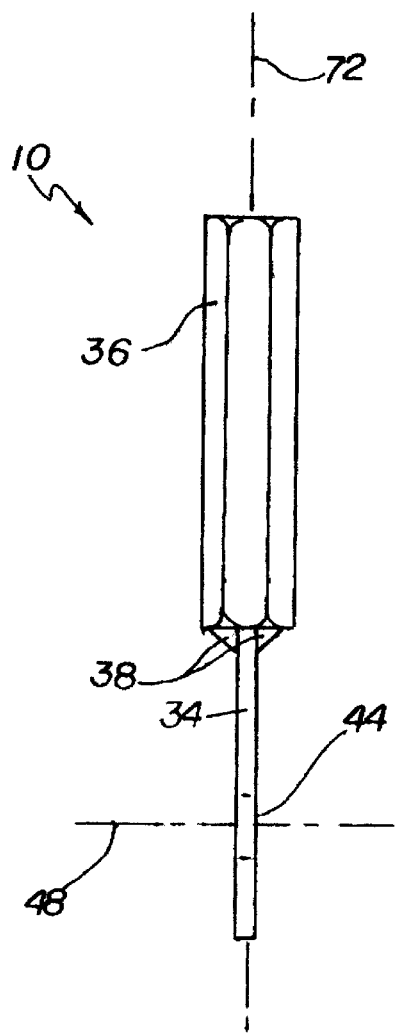
FIG. 5 is a side view of a speed clip hanger bracket of the invention.

The plate aperture 44 is so placed on the bracket plate 34 so that the two flanges 26, 28 of the hanger band do not project into the weldment 38 or nut extender 36. Central axis 72 may intersect the plate aperture 44, and preferably intersects the central axis 48 of the plate aperture 44. As depicted in FIG. 2, the flanges 26,28 extend upwardly to line 80 below the weldment 38.

To suspend a pipe from a structural member of a building, a preformed hanger band 30 is placed about a pipe 12 with the flanges 26, 28 facing upwardly. A speed clip hanger bracket 10 is screwed by hand onto a pre-installed threaded rod 18 suspended from a hanger clamp 22 or similar device. The bracket 10 is easily hand-screwed to obtain the desired pipe elevation. When the desired rotation is achieved, a fastener is passed through a first flange opening 32A, through the aperture 74, and through the second flange opening 32B, and a nut 42 installed.

As an example, hanger brackets 10 were made from steel plate of ⅛ thickness 64 inch and steel nut extenders 36 with ⅜ inch internal screw thread. The brackets 10 were successfully tested at greater than 500 pounds load.

The speed clip hanger bracket 10 as described above and claimed, infra, has numerous advantages. First, it is easily fabricated from standard metal plate and purchasable nut extenders 36. The manufacturing steps comprise cutting of the plate material to form bracket plates 34, forming an aperture 44 in each bracket plate, and welding a nut extender 36 to each bracket plate. Thus, the bracket 10 may be formed inexpensively.

Second, the hanger bracket 10 is extremely easy to work with in operation. No tools are required to attach it to the threaded support rod 18 at a desired elevation. It is easily screwed by hand onto the rod 18 to the desired elevation.

Third, the hanger bracket 10 enables much easier installation in cramped quarters where arm and finger movement is limited.

Fourth, the bracket 10 works with any hanger system having a threaded rod extending downwardly from a hanger clamp or the like.

Fifth, only one separate fastener such as a bolt-nut combination is required.

Sixth, the time required for pipe installation is reduced.

Other advantages are evident to those experienced in the art, based on experience with the use of prior art hangers, and by a careful examination of the foregoing description and the drawings.

It will be apparent from the above description and drawings that the invention provides a novel pipe hanging apparatus which advances the state of the art. The description provides an illustrated example of the invention, and it is contemplated that modifications may be made to the device without deviating from the inventive concept as defined in the following claims.

What is claimed is:

1. A universal hanger bracket for a pipe suspended in space, said hanger bracket comprising:
   a planar rectangular bracket plate having a perimetric edge and an aperture therethrough being aligned and attached to a perforated hanger band supporting said pipe; and
   an elongate nut extender having a central axis through opposite ends thereof, said nut extender having an axial threaded through-hole, one end of said nut extender welded to said perimetric edge to form a unitary hanger bracket.

2. The universal hanger bracket of claim 1, wherein the central axis of said nut extender intersects said aperture.

3. The universal hanger bracket of claim 1, wherein the central axis of said nut extender proximately intersects the central axis of said aperture.

4. The universal hanger bracket of claim 1, wherein said aperture passes through said bracket plate at a generally central position one-third of the width of said bracket plate.

5. The universal hanger bracket of claim 1, wherein said axial threaded through-hole of said elongate nut extender has at least 20 turns of standard thread.

6. The universal hanger bracket of claim 1, wherein said elongate nut extender has a minimum length of 1.5 inches.

7. The universal hanger bracket of claim 1, wherein said axial threaded through-hole of said elongate nut extender has a length of about 1 to about 4 inches.

8. The universal hanger bracket of claim 1, further comprising a threaded fastener passing through said aperture and said perforated hanger band.

9. The universal hanger bracket of claim 1, wherein said axial threaded through-hole is configured for threaded insertion of a standard all-thread rod of $3/8$ inch diameter.

10. The universal hanger bracket of claim 1, further comprising the hanger band passable around a pipe and having an aperture therethrough, wherein said bracket plate has a width approximately equal to the width of said hanger band and is attachable to said hanger band, and said bracket plate aperture and said hanger band aperture are aligned by alignment of said bracket plate and hanger band.

11. The universal hanger bracket of claim 1, wherein said bracket plate is square.

12. The universal hanger bracket of claim 1, wherein said hanger bracket is configured for the suspension of spiral pipe.

* * * * *